UNITED STATES PATENT OFFICE.

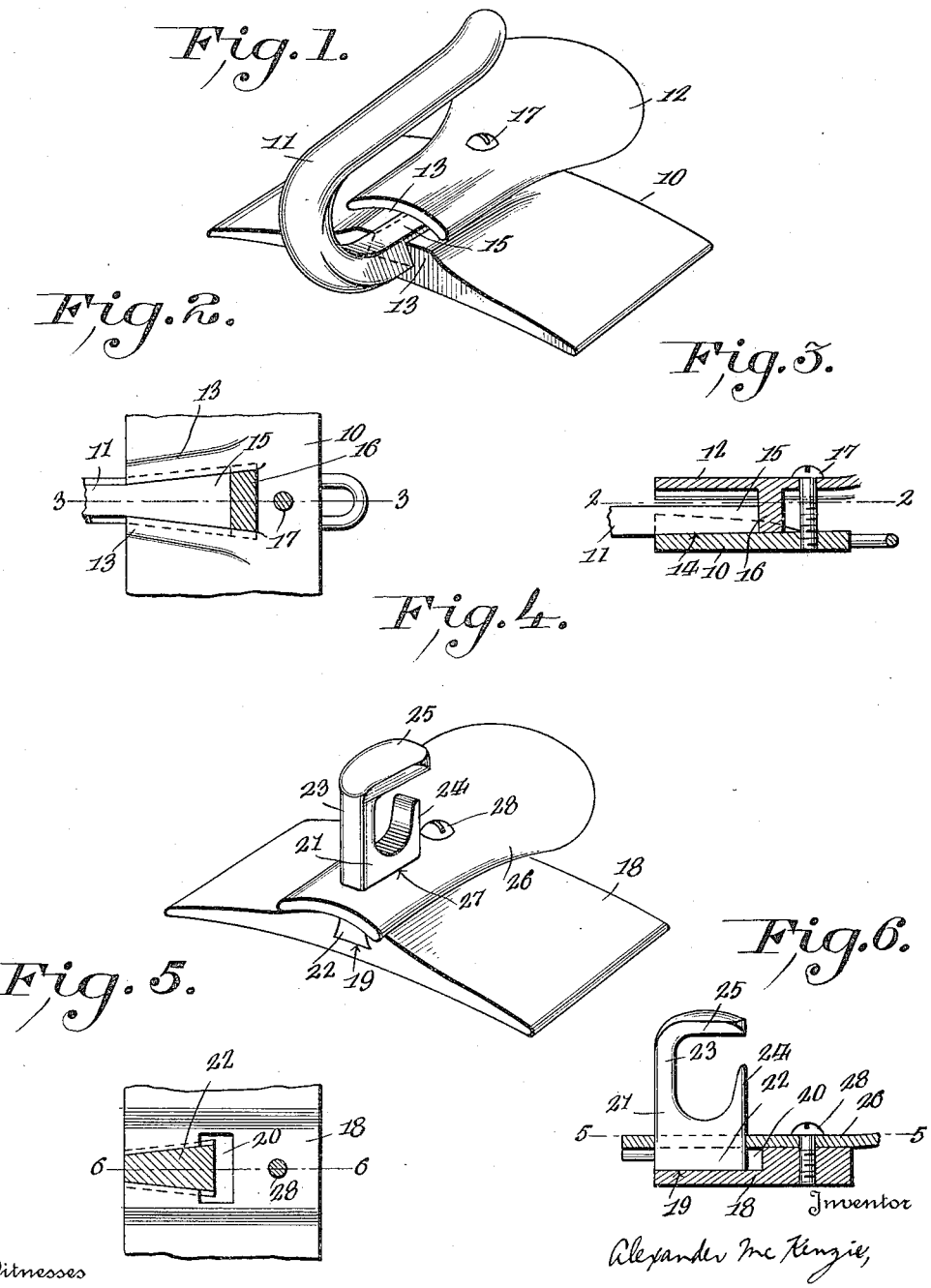

ALEXANDER McKENZIE, OF KIPPEN, ONTARIO, CANADA.

GIG-SADDLE-TREE.

1,169,334.

Specification of Letters Patent.

Patented Jan. 25, 1916.

Application filed December 27, 1913. Serial No. 809,044.

*To all whom it may concern:*

Be it known that I, ALEXANDER MC-KENZIE, a subject of the King of Great Britain, residing at Kippen, in the Province of Ontario and Dominion of Canada, have invented certain new and useful Improvements in Gig-Saddle-Trees, of which the following is a specification.

This invention relates to a gig saddle tree, and the principal object of the invention is to provide a device of the character described which is so constructed that the hook may be easily removed from the base plate and a new hook provided in case the original hook is broken.

Another object of the invention is to so construct the device that when the hook is in place it will be very securely held in place and prevented from working loose.

Another object of the invention is to so construct the device that it may be very cheaply made and very easily and quickly put together and taken to pieces.

This invention is illustrated in the accompanying drawings.

Figure 1 is a perspective view of one form of the gig saddle tree; Fig. 2 is a view taken along the line 2—2 of Fig. 3; Fig. 3 is a sectional view taken along the line 3—3 of Fig. 2; Fig. 4 is a perspective view of a modified form of the gig saddle tree; Fig. 5 is a view taken along the line 5—5 of Fig. 6; Fig. 6 is a sectional view taken along the line 6—6 of Fig. 5.

The form shown in Figs. 1, 2, and 3 comprises a base plate 10, a hook 11, and a securing plate 12. The base plate 10 is provided at a point intermediate its width with enlargements 13 which extend from the forward edge of the base plate to a point adjacent the center thereof and form the side walls of an undercut seat 14. This seat 14 is tapered longitudinally and the side walls gradually decrease in height from the forward edge of the base plate to the inlet end of the seat where the side walls merge into the upper face of the base plate. This construction is very clearly shown in Figs. 2 and 3. The hook 11 has its base portion formed into an enlarged wedge-shaped foot 15 which is dove-tailed in cross section and fits into the seat 14. When this foot 15 is placed in the seat 14 and moved forwardly, the foot will wedge in the seat and thus be prevented from passing out through the constricted outer end of the seat. The securing plate 12 is curved in cross section so that it overhangs the enlargements 13 when in place, and is provided upon its end face with a dove-tailed block 16, which block fits within the inner end portion of the seat 14 as shown in Figs. 2 and 3 and bears against the inner end of the enlarged foot 15 and prevents the foot from moving rearwardly in the seat when the securing plate has been connected with the base plate by means of the screw or bolt 17.

When this gig saddle tree is in use, it is assembled as shown in Fig. 1 and will be very serviceable due to the fact that the hook 11 will be rigidly secured to the base plate and therefore can not work loose and turn upon the plate. If the hook becomes broken, or if it is desired to replace the hook with a hook having a modified form of bill, it is simply necessary to remove the screw 17 and the securing plate 12 can then be removed by sliding the block 16 rearwardly out of the seat 14. The broken hook can then be removed by sliding the hook rearwardly and a new hook could then be put in place and secured in the seat by replacing the securing plate 12.

In Figs. 4, 5, and 6 there has been shown a modified form of the gig saddle tree. In this form the base plate 18 is provided with an enlarged central portion in which there is formed an undercut tapered slot 19 provided with an enlarged inner end portion 20. The hook 21 which is used in connection with the base plate 18 is provided with a wedge-shaped base 22 which has its rear portion flared transversely a greater extent than its forward end portion so that the hook will be tilted slightly when placing the base in the slot 19. After the base has been moved into the slot a sufficient distance, its rear end portion can be dropped into the enlarged-end portion 20 of the slot and the hook then moved to the position shown in Figs. 4 and 6 thus causing the base to be tightly wedged in the slot 19 as shown in Fig. 5. The upper-end portion of this hook is formed into the neck 23 and finger 24, the neck 23 carrying a head 25 which overhangs the upper end of the finger 24. The securing plate 26 is curved in cross section so that it will overhang the walls of the slot or seat 19 and is provided with an opening through which the hook passes. After the hook has been put in place, the securing plate is then put in place with the hook passing through the opening 27 and the plate is then secured to the base plate 18 by means of the screw 28. With this form the hook may be detached from the base plate 18 as readily as the hook 11 may be detached from the base plate 10. It is simply necessary to remove the screw 28 and the securing plate can then be removed from the base plate and the hook removed from the seat 19. It will thus be seen that in both forms there has been shown a base plate provided with a dove-tailed seat, a hook provided with a wedge-shaped base fitting within the seat of the base plate and the securing plate which engages the base of the hook and is secured to the base plate by a securing screw.

What is claimed is:

A gig saddle tree comprising a base plate provided with a tapered undercut slot terminating at its rear end in an enlarged pocket, a hook having a wedge-shaped base having side surfaces normal to said base plate engaged in said slot, and a securing plate having an opening closely fitting said wedge-shaped base to hold the hook in position.

In testimony whereof I affix my signature in presence of two witnesses.

ALEXANDER McKENZIE.

Witnesses:
 ALEX. MURDOCK,
 ALFRED SCURION.

Copies of this patent may be obtained for five cents each, by addressing the "Commissioner of Patents, Washington, D. C."